US012673760B2

(12) United States Patent
Liu et al.

(10) Patent No.: US 12,673,760 B2
(45) Date of Patent: Jul. 7, 2026

(54) OUTBOARD MACHINE

(71) Applicant: ACEL POWER INC, Vancouver (CA)

(72) Inventors: Yu-Chen Liu, Vancouver (CA); Jianmin Ma, Shenzhen (CN)

(73) Assignee: ACEL POWER INC, Vancouver (CA)

( * ) Notice: Subject to any disclaimer, the term of this patent is extended or adjusted under 35 U.S.C. 154(b) by 393 days.

(21) Appl. No.: 18/522,515

(22) Filed: Nov. 29, 2023

(65) Prior Publication Data

US 2024/0182147 A1 Jun. 6, 2024

(30) Foreign Application Priority Data

Dec. 1, 2022 (CN) ......................... 202223207630.5

(51) Int. Cl.
*B63H 20/32* (2006.01)
*B63H 21/21* (2006.01)
*H01R 13/22* (2006.01)
*H01R 13/42* (2006.01)

(52) U.S. Cl.
CPC ............. *B63H 20/32* (2013.01); *H01R 13/22* (2013.01); *H01R 13/42* (2013.01); *B63H 2021/216* (2013.01)

(58) Field of Classification Search
CPC ........ B63H 20/32; H01R 13/22; H01R 13/42; H01R 13/24–2428
USPC ...................................................... 439/34, 39
See application file for complete search history.

(56) References Cited

U.S. PATENT DOCUMENTS 7,572,159 B2 * 8/2009 Ide ....................... F02M 35/168 440/88 A
8,002,597 B2 * 8/2011 Ochiai ................... B63H 20/32 440/89 R
10,533,484 B2 * 1/2020 Coller ..................... F01P 3/202
2016/0023740 A1 * 1/2016 Skrzypchak ........... B63H 20/32 439/34
2020/0318533 A1 * 10/2020 Cornwell ............... F02M 26/05
2022/0282691 A1 * 9/2022 Kuroda ............ F02M 35/10222

* cited by examiner

*Primary Examiner* — Gary F Paumen
(74) *Attorney, Agent, or Firm* — Hemisphere Law, PLLC

(57) ABSTRACT

An outboard machine includes a housing including a first shell and a second shell detachably connected to the first shell, a control module including a first control member arranged on the first shell and a second control member arranged on the second shell, and a wiring module including a first conductive member arranged on the first shell and electrically connected to the first control member, and a second conductive member arranged on the second shell and electrically connected to the second control member. When the first shell is fixed to the second shell, the first conductive member abuts against the second conductive member. The wiring module of the outboard machine provides a contact way to connect the first control member and the second control member, and the first shell and the second shell can be directly disassembled, which is easy to operate without being limited by operation spaces thereof.

20 Claims, 8 Drawing Sheets

OUTBOARD MACHINE

CROSS-REFERENCE TO RELATED APPLICATION

This application claims the benefit of priority from Chinese Patent Application No. 202223207630.5 entitled "CONTACT-TYPE WIRING DEVICE FOR UPPER AND LOWER COVERS OF OUTBOARD MACHINE" and filed on Dec. 1, 2022, the content of which is hereby incorporated by reference in its entire by reference.

TECHNICAL FIELD

The present disclosure generally relates to the field of ship technologies, and especially relates to an outboard machine.

BACKGROUND

At present, control modules such as a lighting system, a sound system, a communication system and a video system are fixed on an inner wall of an upper cover of a conventional outboard machine. These control modules are all connected to a power supply or control modules of a base through wires; one end of the wire is connected to an interface of the control module arranged on the inner wall of the upper cover, and the other end of the wire is connected to the interface of the control module arranged on the base.

When disassembling the upper cover of the conventional outboard machine, it is necessary to disassembly joints of various wire harnesses and then remove the upper cover; when installing the upper cover, it is necessary to reinstall the joints of various wire harnesses, which is time-consuming and labor-intensive throughout the entire process of disassembling or assembling the upper cover; especially when working on a ship, a hull space of the ship is limited and the ship floats on the water surface, so that not only an entire disassembly and assembly process of the upper cover is very time-consuming and labor-intensive, but also a high cost is occurred, and there is also a risk that operators fall into the water.

SUMMARY

The technical problems to be solved: in view of the shortcomings of the related art, the present disclosure provides an outboard machine which can solve technical problems of time-consuming, labor-intensive and inconvenient operation of a disassembly and assembly process caused by conductive wiring harnesses or communication wiring harnesses of a conventional outboard machine.

In order to achieve the above mentioned purpose, the present disclosure provides the following technical solutions:

an outboard machine according to an embodiment of the present disclosure includes:

a housing including a first shell and a second shell detachably connected to the first shell;

a control module including a first control member arranged on the first shell and a second control member arranged on the second shell; and a wiring module including a first conductive member arranged on the first shell and electrically connected to the first control member, and a second conductive member arranged on the second shell and electrically connected to the second control member; and wherein when the first shell is fixed to the second shell, the first conductive member abuts against the second conductive member.

Wherein the first conductive member elastically abuts against the second conductive member.

Wherein the first conductive member includes a first fixing bracket arranged on the first shell, and a conductive sheet arranged on the first fixing bracket;

the second conductive member including a second fixing bracket arranged on the second shell, and a probe arranged on the second fixing bracket; and wherein when the first shell is fixed with the second shell, the probe is in contact with the conductive sheet; while when the first shell is disassembled from the second shell, the probe is separated from the conductive sheet.

Wherein the first fixing bracket includes:

a fixing plate parallel to a first inner wall of the first shell and fixed with the inner wall of the first shell; and a base connected with the fixing plate and an angle formed between the base and the fixing plate, and the conductive sheet detachably arranged on the base.

Wherein a clamping slot is arranged on the base, and an elastic portion is arranged on the conductive sheet; the conductive sheet inserted into or taken out of the clamping slot, and the elastic portion abutting against the inner wall of the clamping slot.

Wherein the base includes a groove passing through an end face of the base that is away from the fixing plate, the clamping slot formed by inwardly concaving a side wall of the groove, and an edge of the conductive sheet inserted into the clamping slot.

Wherein the first fixing bracket includes a plurality of stiffeners, two adjacent edges of each of the plurality of stiffeners respectively connected to the fixing plate and the base; and the plurality of stiffeners arranged on a side of the base away from the probe.

Wherein the clamping slot is formed by inwardly concaving an end face of the base that is away from the fixing plate, and a hole is arranged on a side of the base that faces the probe, the probe passing through the hole to abut against the conductive sheet.

Wherein the base includes an annular flange surrounding around the hole, the probe extending into the annular flange.

Wherein the second fixing bracket includes:

a seat with a through-hole being formed at a bottom surface thereof; and a sleeve arranged around the through-hole, and the probe penetrating into the sleeve.

Wherein the probe is a spring probe and includes:

a fixing portion inserted into the sleeve, one end of the fixing portion detachably connected to a first limiting portion, the first limiting portion being in contact with one end face of the sleeve; and a body with one end slidably passing through the fixing portion and the other end being in contact with the conductive sheet; the body including a second limiting portion abutting against the other end face of the sleeve; and an elastic member sleeved on the body, one end of the elastic member connected to the fixing portion, and the other end of the elastic member connected to the body.

Wherein at least two posts are arranged inside the body, and a positioning hole arranged in each of the at least two posts, the second shell including a supporting rib extending into the positioning hole.

Wherein outer walls of two adjacent posts are connected with each other to form a concave guiding groove with an arc-shaped wall thereof.

Wherein the sleeve is arranged inside the seat and formed on opposite sides of the post, the probe received in each sleeve and the conductive sheet arranged on each probe.

Wherein the first conductive member includes a first fixing bracket and at least two conductive sheets, the first fixing bracket including a fixing plate, a base and a stiffener, the fixing plate parallel to a first inner wall of the first shell and fixed with the inner wall of the first shell, the base connected with the fixing plate and an angle formed between the base and the fixing plate, a groove arranged on the base and passing through an end face of the base that is away from the fixing plate, a clamping slot formed by inwardly concaving a side wall of the groove, an edge of the conductive sheet inserted into or taken out of the clamping slot, and an elastic portion arranged on the conductive sheet and abutting against a second inner wall of the clamping slot, two adjacent edges of the stiffener respectively connected to the fixing plate and the base, and the stiffener arranged on a side of the base that is away from the groove; and wherein the second conductive member includes a second fixing bracket and at least two probes, each of the at least two probes correspondingly including the conductive sheet; and the second fixing bracket including a seat, a sleeve and at least two posts, a through-hole arranged on a bottom surface of the seat, and the sleeve arranged around the through-hole; the probe including a fixing portion, a body and an elastic member, wherein the fixing portion is inserted into the sleeve, one end of the fixing portion detachably connected to a first limiting portion that abuts against one end face of the sleeve, one end of the body slidably passing through the fixing portion, and the other end of the body being in contact with the conductive sheet, the body including a second limiting portion abutting against the other end face of the sleeve; the elastic member sleeved on the body, one end of the elastic member connected to the fixing portion, and the other end of the elastic member connected to the body, a positioning hole arranged in the post, the second shell including a supporting rib extending into the positioning hole, and outer walls of two adjacent posts connected to each other to form a concave guiding groove with an arc-shaped wall thereof, the sleeve arranged inside the seat and formed on opposite sides of the post, the probe received in each sleeve.

Wherein an installation position between the housing and at least one of the first fixing bracket and the second fixing bracket is adjusted.

Wherein at least one of the first fixing bracket and the second fixing bracket is fixed with the housing through a fastener; and a long-strip hole formed on at least one of the first fixing bracket and the second fixing bracket, and the fastener passing through the long-strip hole and engaged with the housing.

Wherein the first conductive member magnetically abuts against the second conductive member.

Wherein one of the first conductive member and the second conductive member includes an electromagnetic coil or a magnetic male seat, and the other of the first conductive member and the second conductive member includes an electromagnetic sheet or a magnetic female seat; the electromagnetic coil adsorbed the electromagnetic sheet, and the magnetic male seat adsorbed the magnetic female seat.

Wherein the first shell includes a first end face, and the second shell includes a second end face, a shape of the first end face same as that of the second end face, both the first end face and the second end face are non-centrosymmetric.

The present disclosure provides the advantages as below:

The wiring module of the outboard machine provides a contact way to connect the first control member and the second control member, so that when the first shell is disassembled from the second shell, there is no need to disassemble any interfaces therebetween; and after the first shell and the second shell are separated from each other, the wiring module is disconnected and separated so that the first shell or the second shell can be directly removed, which is easy to operate without being limited by operation spaces, has good safety for operators, and reduces usage and maintenance costs.

When assembling the first shell and the second shell, the first shell is fixed with the second shell to achieve mutual contact and electrical connection between the first conductive member and the second conductive member, which is convenient to operate the outboard machine.

The above-mentioned outboard machine of the present disclosure is provided for a ship, which is convenient for disassembly and assembly without being limited by operation spaces, has good safety for operators and reduces usage and maintenance costs.

Figure 1:
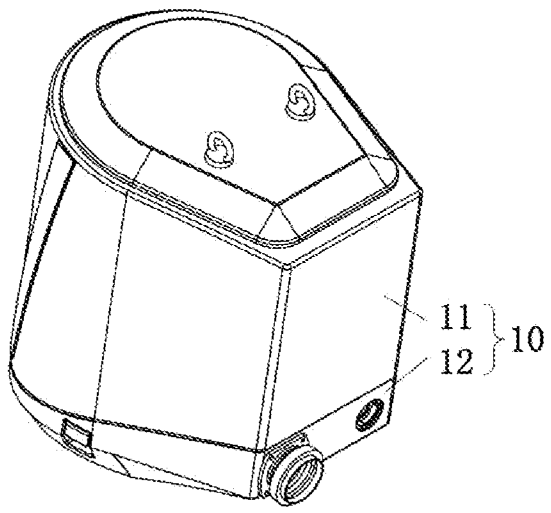
FIG. 1 is a schematic view of an outboard machine in accordance with a first embodiment of the present disclosure.

The element labels according to the embodiment of the present disclosure shown as below:

10 housing, 11 first shell, 111 first inner wall, 112 first end face, 12 second shell, 121 supporting rib, 122 second end face, 20 wiring module, 21 first conductive member, 211 first fixing bracket, 2111 fixing plate, 2112 base, 21121 groove, 21122 clamping slot, 211221 second inner wall, 21123 hole, 2113 stiffener, 21124 flange, 212 conductive sheet, 2121 elastic portion, 22 second conductive member, 221 second fixing bracket, 2211 seat, 22111 through-hole, 2212 sleeve, 2213 post, 22131 positioning hole, 2214 guiding groove, 222 probe, 2221 fixing portion, 22211 first limiting portion, 2222 body, 22221 second limiting portion, 2223 elastic member, 31 first control member, 32 second control member, 41 first wiring harness, 42 second wiring harness.

DETAILED DESCRIPTION

Reference will now be made in detail to embodiments, examples of which are illustrated in the accompanying drawings. It should be understood that terms used in the description of the present disclosure herein are only for the purpose of describing specific embodiments and are not intended to limit the present disclosure. It should also be further understood that for a convenience of description, the accompanying drawings only show some parts related to the present disclosure rather than all structures of the present disclosure.

In the following detailed description of the present disclosure, except where specifically otherwise illustrated or limited, the terms “install”, “connect”, “link” and “fix” used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

In the present disclosure, except where specifically otherwise illustrated or limited, a first feature “above” or “below” a second feature can include that the first feature is directly contact with the second feature, or the first feature is contact with the second feature through other features between the first feature and the second feature, rather than the first feature is directly contact with the second feature. Furthermore, the first feature “above”, “on”, and “over” the second feature can include the first feature directly above and diagonally above the second feature, or simply indicate that a horizontal height of the first feature is higher than that of the second feature. The first feature “below”, “under”, and “lower” the second feature can include the first feature directly below and diagonally below the second feature, or simply indicate that the horizontal height of the first feature is less than that of the second feature.

In the description of the present disclosure, the terms such as “upper”, “below” and “right”, etc, are shown in the specification of the present disclosure. The indicated orientation or position of the above terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms used to describe positional relationships in the attached drawings are only for illustrative purposes, and illustrated in the detail description are not by way of the limitation of the present disclosure. In addition, terms “first” and “second” are only used to distinguish descriptions of the present disclosure, rather than have special meanings.

A First Embodiment

Figure 2:
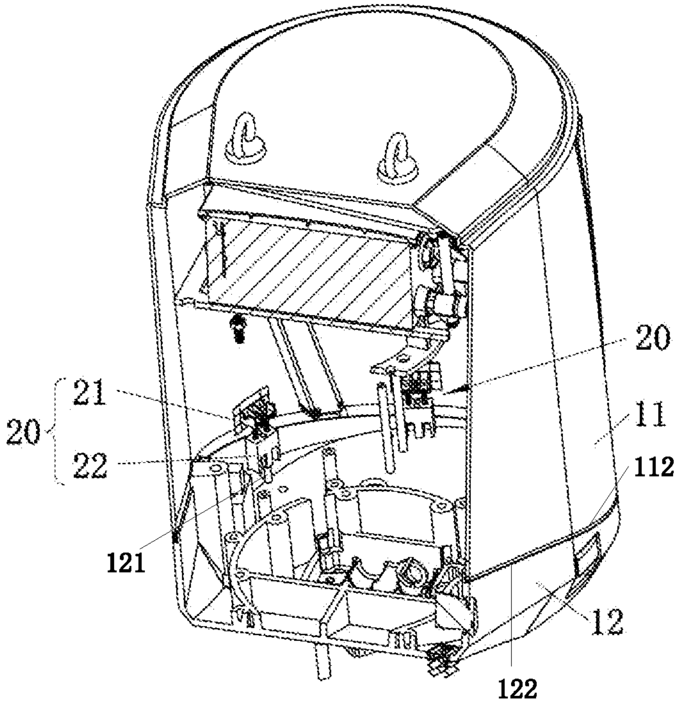
FIG. 2 is a cross sectional view of the outboard machine of FIG. 1.
Figure 3:
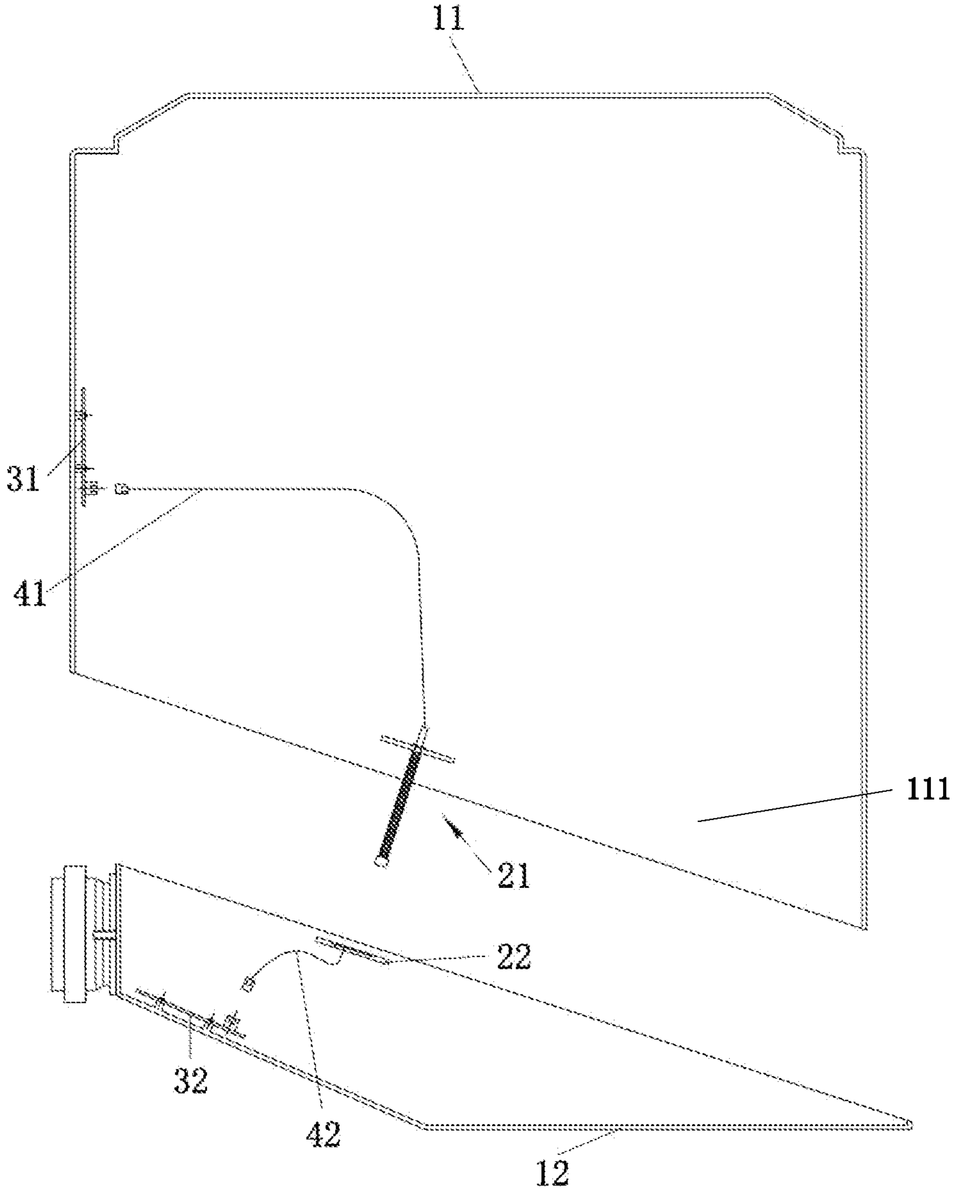
FIG. 3 is a schematic view of an internal structure of the outboard machine of FIG. 1.

Referring to FIGS. 1-3, an outboard machine according to an embodiment of the present disclosure includes a housing 10, a power system and a control module. The power system is installed in the housing 10. The control module can be a lighting system, a sound system, a video system, a communication system or a power system.

The housing 10 includes a first shell 11 and a second shell 12 detachably connected to the first shell 11. The first shell 11 and the second shell 12 are assembled to form a receiving room therebetween for receiving the control module therein. The control module includes a first control member 31 and a second control member 32. The first control member 31 is arranged on the first shell 11 and the second control member 32 is arranged on the second shell 12. The first control member 31 and the second control member 32 require electrical connection or communication connection therebetween to work together.

In order to obtain a connection between the first control member 31 and the second control member 32, the outboard machine also includes a wiring module 20 received in the receiving room and configured to connect the first control member 31 and the second control member 32.

In order to avoid that the wiring module 20 is provided for causing time-consuming and labor-intensive, and inconvenient operation of disassembling and assembling the first shell 11 and the second shell 12, in an embodiment of the present disclosure, the wiring module 20 provides a contact way to connect the first control member 31 and the second control member 32, so that when the first shell 11 is disassembled from the second shell 12, there is no need to disassemble any interfaces of the outboard machine; and after the first shell 11 and the second shell 12 are separated from each other, the wiring module 20 is disconnected and separated so that the first shell 11 or the second shell 12 can be directly removed, which is easy to operate without being limited by operation spaces of the outboard machine, has good safety for operators, and reduces usage and maintenance costs.

Specifically, referring to FIG. 2 and FIG. 3, the wiring module 20 includes a first conductive member 21 arranged on the first shell 11 and electrically connected to the first control member 31, and a second conductive member 22 arranged on the second shell 12 and electrically connected to the second control member 32; when the first shell 11 and the second shell 12 are fixed with each other, the first conductive member 21 abuts against the second conductive member 22. It can also be understood that: when the first shell 11 and the second shell 12 are fixed with each other, the first conductive member 21 and the second conductive member 22 are in contact with each other along with a fixed connection between the first shell 11 and the second shell 12, thereby obtaining an electrical connection between the first conductive member 21 and the second conductive member 22. It should be noted that when the first shell 11 and the second shell 12 are separated from each other, the first conductive member 21 can be separated from the second conductive member 22 by following a separation between the first shell 11 and the second shell 12.

Referring to FIG. 3, the first conductive member 21 is connected to a first wiring harness 41 that is connected to the first control member 31. The second conductive member 22 is connected to a second wiring harness 42 that is connected to the second control member 32. By setting the first wiring harness 41 and the second wiring harness 42, it is possible to conveniently and reasonably adjust a relative position between the first control member 31 and the first conductive member 21, as well as a relative position between the second control member 32 and the second conductive member 22.

In order to avoid entanglement between the first wiring harness 41 and the second wiring harness 42, a harness fixing structure is also installed inside the housing 10 to fix the first wiring harness 41 and the second wiring harness 42. Optionally, the harness fixing structure can be a wiring duct and/or a wire clamp.

In some embodiments of the present disclosure, the first conductive member 21 can be directly connected to the first control member 31, and the second conductive member 22 can be directly connected to the second control member 32.

In order to ensure a contact effect between the first conductive member 21 and the second conductive member 22, the first conductive member 21 and the second conductive member 22 are elastically connected to each other, a pre-tightening force is provided for the connection between the first conductive member 21 and the second conductive member 22 through an elastic force being formed between the first conductive member 21 and the second conductive member 22, which can ensure that the first conductive member 21 is always in contact with the second conductive member 22, after the first shell 11 is assembled with the second shell 12.

Each of the first conductive member 21 and the second conductive member 22 includes a fixing bracket arranged on the housing 10, and a conductive portion electrically connected to the control module.

Figure 4:
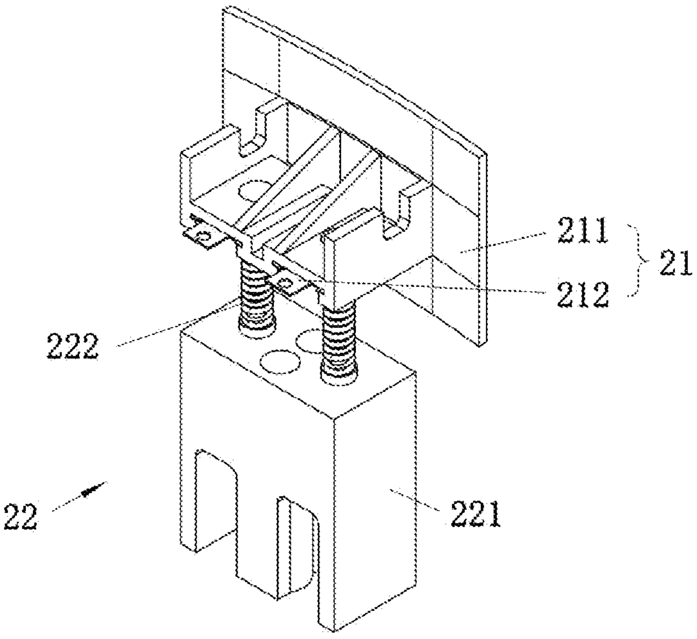
FIG. 4 is a schematic view of wiring module of the outboard machine of FIG. 1.
Figure 5:
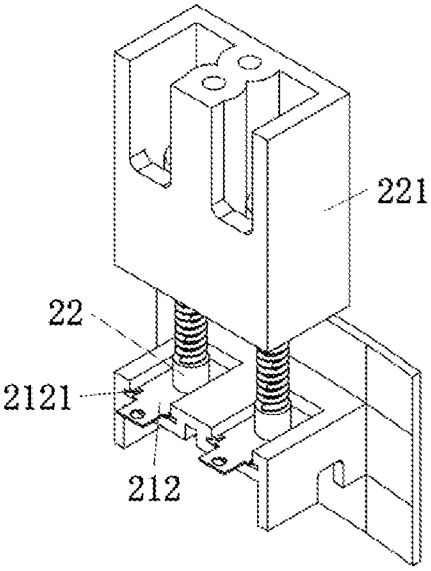
FIG. 5 is similar to FIG. 4, but shown from another view.

For a convenience of differentiation, referring to FIG. 4 and FIG. 5, the fixing bracket of the first conductive member 21 is taken as a first fixing bracket 211, and the conductive portion of the first conductive member 21 is taken as a first conductive portion; while the fixing bracket of the second conductive member 22 is taken as a second fixing bracket 221, and the conductive portion of the second conductive member 22 is taken as a second conductive portion.

In an embodiment of the present disclosure, the second conductive portion is an elastic probe 222 to obtain an elastic connection between the first conductive member 21 and the second conductive member 22. The first conductive portion is neither elastic, nor having expansion and contraction functions. It can be understood that the first conductive portion can also have elastic expansion and contraction functions. For example, in other embodiments, the first conductive portion can have elastic expansion functions, while the second conductive portion does not have elastic expansion functions. For example, in other embodiments, both the first conductive portion and the second conductive portion have elastic expansion functions.

In order to ensure electrical safety, each of the first fixing bracket 211, the second fixing bracket 221, the first shell 11 and the second shell 12 can be made of an insulation material to obtain insulation connection between the conductive portion and each of the first fixing bracket 211, the second fixing bracket 221, the first shell 11 and the second shell 12.

In some embodiments, both the first fixing bracket 211 and the second fixing bracket 221 can be made of insulation materials, and both the first shell 11 and the second shell 12 can be adjusted whether to be made of insulation materials according to actual needs. For example, both the first shell 11 and the second shell 12 can be made of insulation materials or non-insulation materials.

Optionally, an insulation layer can be coated on surfaces of both the first fixing bracket 211 and the second fixing bracket 221, as well as both the first shell 11 and the second shell 12, to obtain insulation connection between the conductive portion and each of the first fixing bracket 211, the second fixing bracket 221, the first shell 11 and the second shell 12.

In an embodiment of the present disclosure, the first conductive portion is a conductive sheet 212, and the second conductive portion is a probe 222, so that the first conductive portion is electrically connected to the second conductive portion by the probe 222 abutting against the conductive sheet 212.

In order to improve a contact effect between the probe 222 and the conductive sheet 212, an end of the probe 222 that is in contact with the conductive sheet 212 can be a tip in point or line contact with the conductive sheet 212 to avoid contact failure caused by uneven contact positions between the probe 222 and the conductive sheet 212.

The tip can be conical or pyramid to be in contact with the conductive sheet 212; furthermore, the tip can also include edges that are contact with the conductive sheet 212.

In some embodiments, an end face of the probe 222 that is in contact with the conductive sheet 212 can be parallel to a surface of the conductive sheet 212 to obtain a surface contact between the probe 222 and the conductive sheet 212.

In an embodiment of the present disclosure, a structure of the first conductive portion is different from that of the second conductive portion. In other embodiments, the structure of the first conductive portion can be the same as that of the second conductive portion, that is, both the first conductive portion and the second conductive portion can be probes 222 or conductive sheets 212.

In order to ensure alignment accuracy of the probe 222 and the conductive sheet 212, an exposed area of the conductive sheet 212 is greater than an area of the end face of the probe 222 that is in contact with the conductive sheet 212, thereby allowing for a certain alignment error between the probe 222 and the conductive sheet 212, thus ensuring that the probe 222 can be in contact with the conductive sheet 212.

Optionally, a center of the exposed area of the conductive sheet 212 is directly opposite to the probe 222, and a distance between an edge of the exposed area of the conductive sheet 212 and the probe 222 can be 2-5 mm, such as 2 mm, 3 mm, 4 mm, or 5 mm.

In an embodiment of the present disclosure, the second fixing bracket 221 is arranged on the second shell 12, the probe 222 is a spring probe and arranged on the second fixing bracket 221; the first conductive member 21 includes the first fixing bracket 211 and the conductive sheet 212. The first fixing bracket 211 is arranged on the first shell 11, and the conductive sheet 212 is arranged on the first fixing bracket 211. The probe 222 is in contact with the conductive sheet 212.

Figure 6:
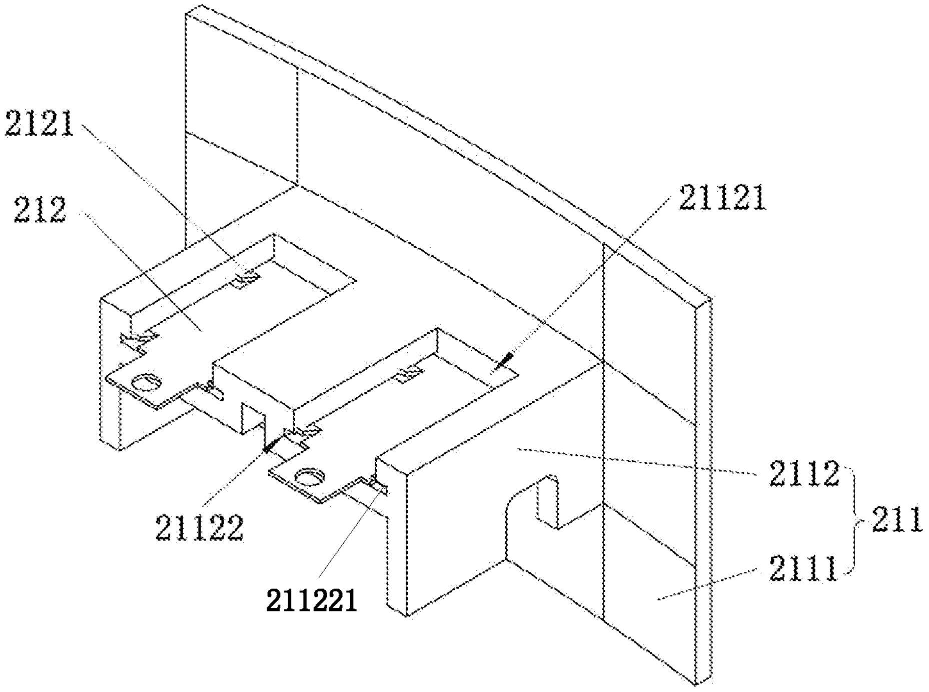
FIG. 6 is a schematic view of a first conductive member of the outboard machine of FIG. 1.

Referring to FIG. 6, the first fixing bracket 211 includes a fixing plate 2111 and a base 2112. The fixing plate 2111 is parallel to a first inner wall 111 of the first shell 11 and fixed with the first inner wall 111 of the first shell 11, to increase a contact area between the fixing plate 2111 and the first shell 11, in order to improve a fixation effect therebetween. The base 2112 is connected with the fixing plate 2111 and an angle formed between the base 2112 and the fixing plate 2111, and the conductive sheet 212 is detachably arranged on the base 2112. In an embodiment of the present disclosure, the base 2112 is perpendicularly connected with the fixing plate 2111 so that the probe 222 can be conveniently in contact with the conductive sheet 212.

Optionally, a shape of the fixing plate 2111 is matched with a shape of the first shell 11 to increase a contact area between the fixing plate 2111 and the first shell 11.

Figure 7:
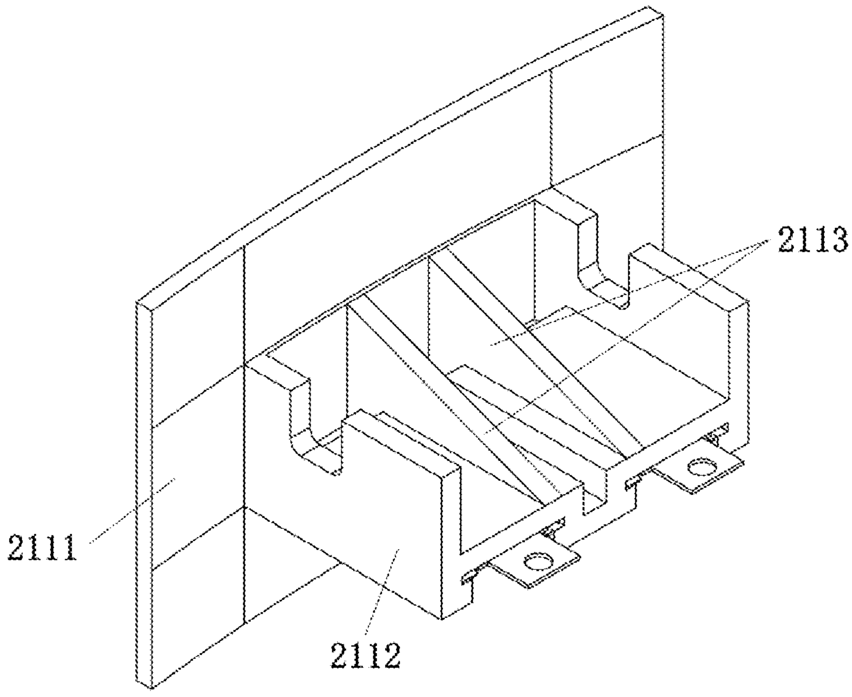
FIG. 7 is similar to FIG. 6, but shown from another view.

Referring to FIG. 7, the first fixing bracket 211 includes a plurality of stiffeners 2113, two adjacent edges of each of the plurality of stiffeners 2113 respectively connected to the fixing plate 2111 and the base 2112 to strengthen and enhance the first fixing bracket 211. In an embodiment of the present disclosure, the plurality of stiffeners 2113 is arranged on a side of the base 2112 away from the probe 222. When the probe 222 is in contact with the conductive sheet 212, a force received by the conductive sheet 212 is transmitted to the plurality of stiffeners 2113 through the base 2112, which can prevent the base 2112 from being damaged due to an excessive force applied on the base 2112.

The conductive sheet 212 is fixedly plugged into the first fixing bracket 211. Referring to FIG. 6 and FIG. 7, the base 2112 includes a clamping slot 21122, and the conductive sheet 212 includes an elastic portion 2121. The conductive sheet 212 is inserted into or taken out of the clamping slot 21122. When the conductive sheet 212 is inserted into the clamping slot 21122, the elastic portion 2121 is in contact with a second inner wall 211221 of the clamping slot 21122. In an embodiment of the present disclosure, the conductive sheet 212 is fixed to the clamping slot 21122 through an insertion way, which is easy to disassemble and replace the conductive sheet 212.

The elastic portion 2121 can be formed by bending the conductive sheet 212, which is convenient for processing the elastic portion 2121, beneficial for reducing costs and components of the outboard machine.

In order to the probe 222 is in contact with the conductive sheet 212 conveniently, the base 2112 includes a groove 21121 passing through an end face of the base 2112 that is away from the fixing plate 2111, the clamping slot 21122 formed by inwardly concaving a side wall of the groove 21121, and an edge of the conductive sheet 212 inserted into the clamping slot 21122. By setting the groove 21121, some conductive sheets 212 can be exposed to facilitate contact between the probe 222 and the conductive sheet 212.

Figure 8:
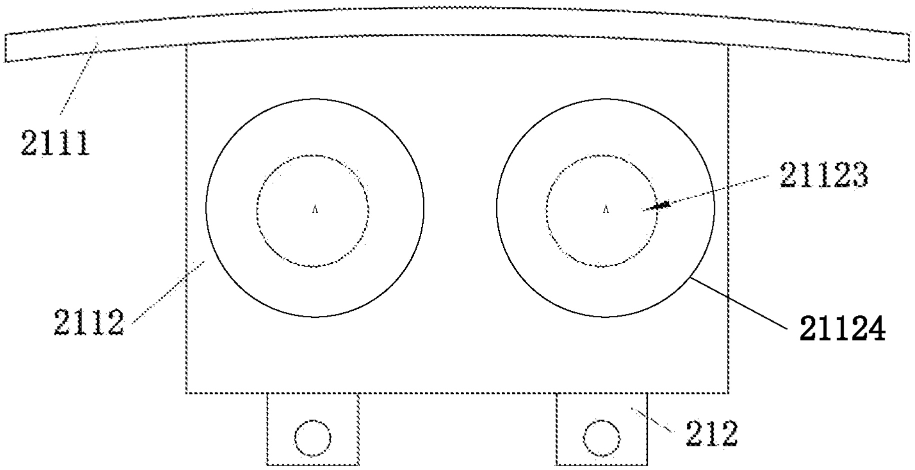
FIG. 8 is a main view of another first conductive member of the outboard machine of the present disclosure.

In some embodiments of the present disclosure, referring to FIG. 8, the clamping slot 21122 is formed by inwardly concaving an end face of the base 2112 that is away from the fixing plate 2111, and a hole 21123 is arranged on a side of the base 2112 that faces the probe 222, the probe 222 passing through the hole 21123 to abut against the conductive sheet 212, so that some parts of the conductive sheet 212 are exposed outwardly.

Furthermore, the base 2112 includes an annular flange 21124 surrounding around the hole 21123, the probe 222 extending into the annular flange 21124. The circular flange 21124 can provide guidance for the probe 222 to improve the contact effect between the probe 222 and the conductive sheet 212.

Figure 9:
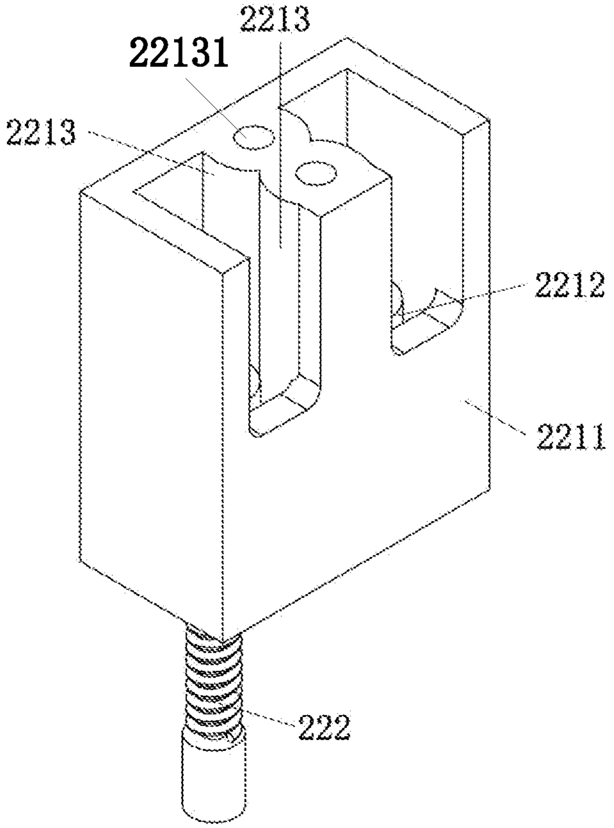
FIG. 9 is a schematic view of a second conductive member of the outboard machine of FIG. 1.
Figure 10:
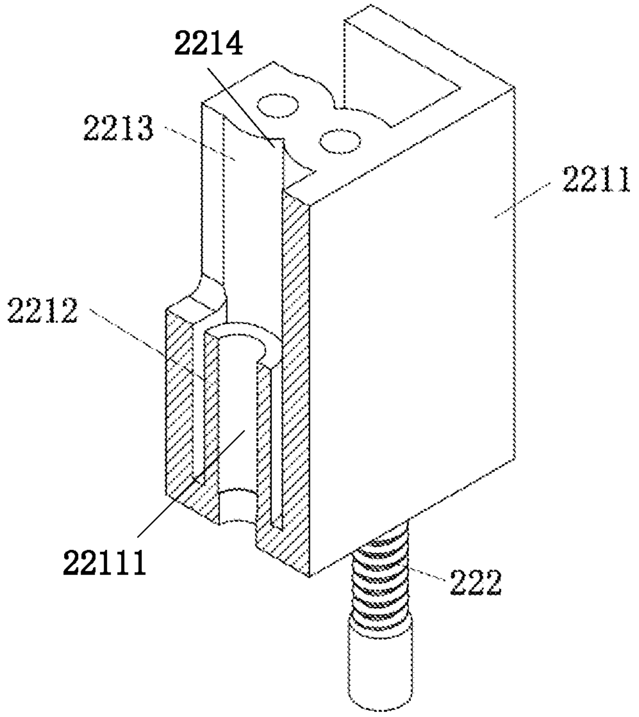
FIG. 10 is a cross sectional view of the second conductive member of the outboard machine of FIG. 1.

Referring to FIG. 9 and FIG. 10, the second fixing bracket 221 includes a seat 2211 with a through-hole 22111 being formed at a bottom surface thereof, and a sleeve 2212 arranged around the through-hole 22111. The probe 222 penetrates into the sleeve 2212. The sleeve 2212 cooperates with the probe 222 to guide the probe 222 and ensure a positioning accuracy between the probe 222 and the conductive sheet 212.

Figure 11:
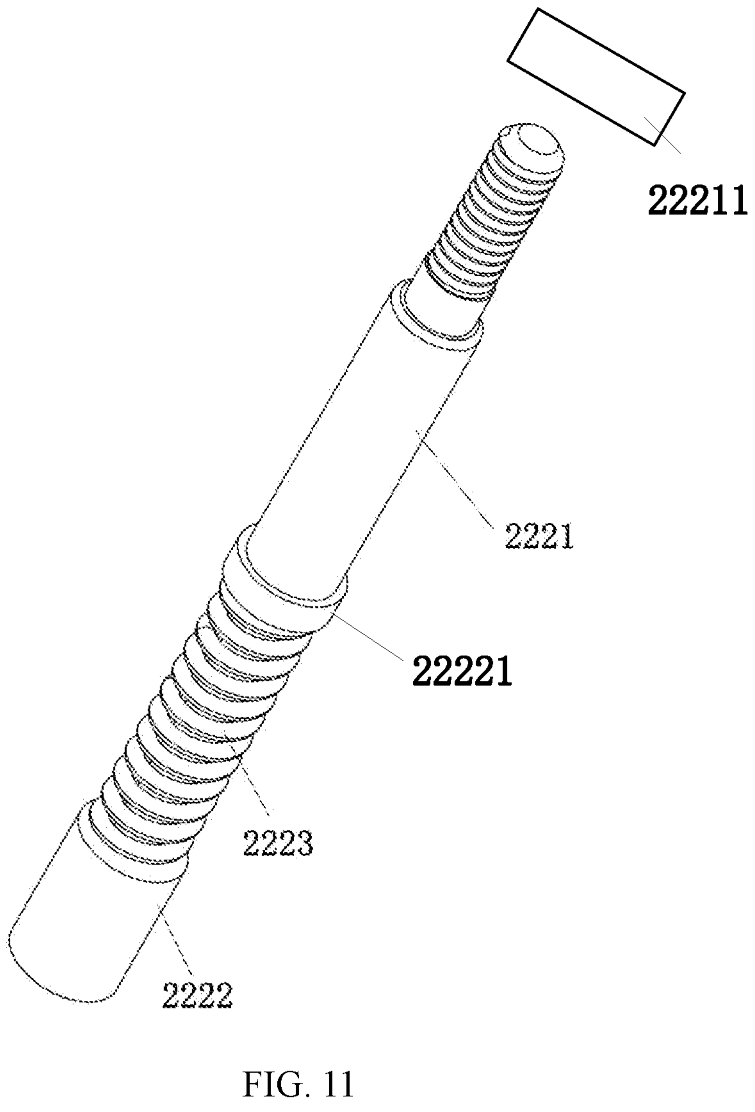
FIG. 11 is a schematic view of a probe of the outboard machine of FIG. 1.

Referring to FIG. 11, the probe 222 includes a fixing portion 2221, a body 2222 and an elastic member 2223. The fixing portion 2221 is inserted into the sleeve 2212, one end of the fixing portion 2221 detachably connected to a first limiting portion 22211, the first limiting portion 22211 being in contact with one end face of the sleeve 2212. One end of the body 2222 slidably passes through the fixing portion 2221, and the other end of the body 2222 is in contact with the conductive sheet 212; the body 2222 including a second limiting portion 22221 abutting against the other end face of the sleeve 2212. The elastic member 2223 is sleeved on the body 2222, one end of the elastic member 2223 connected to the fixing portion 2221, and the other end of the elastic member 2223 connected to the body 2222. The probe 222 is equipped with the elastic member 2223 to enable that the body 2222 can be in elastic contact with the conductive sheet 212, thereby ensuring the contact effect between the probe 222 and the conductive sheet 212.

Optionally, the first limiting portion 22211 can be a nut fixed to a thread of the fixing portion for easy disassembly and assembly of the probe 222.

Figure 12:
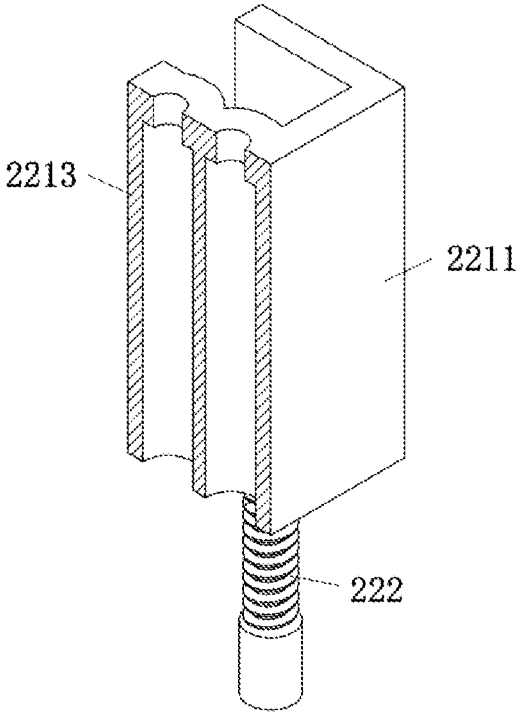
FIG. 12 is similar to FIG. 10, but shown from another view.

Referring to FIG. 9 and FIG. 12, at least two posts 2213 are arranged inside the body 2211, and a positioning hole 22131 arranged in each of the at least two posts 2213. The second shell 12 includes a supporting rib 121 extending into the positioning hole 22131, so as to fix the second fixing bracket 221 and the second shell 12.

Furthermore, outer walls of two adjacent posts 2213 are connected with each other to form a concave guiding groove 2214 for providing guidance for the probe 222 and facilitate to assembly the probe 222. In an embodiment of the present disclosure, a wall of the guiding groove 2214 is an arc-shaped structure to match with an outer wall of the probe 222. In this way, when the probe 222 moves inside the guiding groove 2214, the wall of the guiding groove 2214 can effectively limit the probe 222, so as to provide better guidance for the probe 222 to move inside the guiding groove 2214, thereby facilitating stable movement of the probe 222 inside the guiding groove 2214. Therefore, it can improve contact stability between the probe 222 and the conductive sheet 212.

In an embodiment of the present disclosure, the post 2213 is a cylinder. The outer wall of the cylinder is curved, and the concave guiding groove 2214 is formed between two adjacent cylinders, rather than additionally processing the guiding groove 2214, which is beneficial for reducing processing costs thereof.

The sleeve 2212 is arranged inside the seat 2211 and formed on opposite sides of the post 2213, the probe 222 received in each sleeve 2212, and the conductive sheet 212 arranged on each probe 222.

The first shell 11 has a first end face 112, and the second shell 12 has a second end face 122 with a shape same as that of the first end face 121, both the first end face 121 and the second end face 122 are non-centrosymmetric. By setting each of the first end face 121 and the second end face 122 with a non-centrosymmetric shape, the first shell 11 and the second shell 12 can only be assembled with each other at a specified angle therebetween, which can ensure positional accuracy between the first conductive member 21 and the second conductive member 22.

In an embodiment of the present disclosure, each of the first shell 11 and the second shell 12 includes an arc-shaped surface and a planar surface connected to the arc-shaped surface, so as to cooperatively form the outboard machine that is circumferentially enclosed. When the first shell 11 and the second shell 12 are assembled, the plane surface of the first shell 11 needs to be opposite to the plane surface of the second shell 12, so that an assembly angle between the first shell 11 and the second shell 12 is fixed, thereby obtaining an assembly foolproof function therebetween.

In other embodiments of the present disclosure, both the first end face 121 and the second end face 122 can be non-equilateral polygons such as rectangles, or other irregular shapes.

In order to avoid significant positional errors between the probe 222 and the conductive sheet 212, which results in inability to fit the probe 222 with the conductive sheet 212, installation positions of the fixing bracket and the housing 10 can be adjusted, and a relative position between the first conductive member 212 and the second conductive member 222 can be adjusted according to actual assembly situations.

In order to adjust positions of the fixing bracket, the fixing bracket is fixed to the housing 10 through fasteners. A long-strip hole is formed on one of the shell 10 and the fixing bracket, while a fixing hole is formed on the other of the shell 10 and the fixing bracket. The fastener passes through the long-strip hole to fit with the fixing hole. A position of the fastener inside the long-strip hole can be adjusted along a length direction of the long-strip hole, so as to adjust the position of the fixing bracket, which has a simple structure and a convenient operation thereof. The fastener can be a screw or a pin.

Furthermore, there are two long-strip holes arranged on the fixing bracket or the housing 10, and extension directions of the two long-strip holes are perpendicular to each other. By setting the two long-strip holes, the position of the fixing bracket in any directions can be adjusted, which can not only ensure a relative setting between the first conductive portion and the second conductive portion, but also adjust a contact interference between the first conductive portion and the second conductive portion to adjust the contact effect therebetween.

An experience wear and tear of the conductive portion is occurred during a contact process of the conductive portion. In this way, in order to ensure the contact effect, the conductive portion can be detachably connected to the fixing bracket so that the conductive portion can be timely replaced.

In an embodiment of the present disclosure, there are at least two wiring modules 20 configured to perform power transmission or signal transmission. Functions of different wiring modules 20 can be different, that is, some wiring modules 20 are configured to perform power transmission and other wiring modules 20 configured to perform signal transmission. A signal can be a voice signal, an image signal or a communication signal.

When disassembling the outboard machine of the present disclosure, there is no need to disassemble any interfaces of the outboard machine. After the first shell 11 and the second shell 12 are separated from each other, the wiring module 20 is disconnected and separated so that the first shell 11 or the second shell 12 can be directly removed, which is easy to operate without being limited by operation spaces, has good safety for operators, and reduces usage and maintenance costs.

A Second Embodiment

An outboard machine according to the second embodiment of the present disclosure is provided, which differs from the first embodiment of the present disclosure in that: in the first embodiment, the elastic member 2223 is provided for obtaining the elastic connection between the first conductive portion and the second conductive portion. In the second embodiment of the present disclosure, the first conductive portion and/or the second conductive portion are elastic structures, and there is no need to additionally set the elastic member 2223, which is beneficial for reducing costs and elements of the outboard machine.

In the second embodiment, the first conductive portion or the second conductive portion is an elastic piece or a spring to obtain elastic contact therebetween through their own elasticity.

In other embodiments, both the first conductive portion and the second conductive portion can be elastic structures; structures of the first conductive portion and the second conductive portion can be the same or different; for example, both the first conductive portion and the second conductive portion are springs or elastic pieces, or one of the first conductive portion and the second conductive portion is a spring and the other of the first conductive portion and the second conductive portion is an elastic piece.

In the second embodiment, when the first shell 11 and the second shell 12 are disassembled, there is no need to disassemble any interfaces of the outboard machine. After the first shell 11 and the second shell 12 are separated from each other, the wiring module 20 is disconnected and separated so that the first shell 11 or the second shell 12 can be directly removed, which is easy to operate without being limited by operation spaces, has good safety for operators, and reduces usage and maintenance costs.

A Third Embodiment

An outboard machine according to the third embodiment of the present disclosure is provided, which differs from the first and second embodiments of the present disclosure in that: in the third embodiment of the present disclosure, the elastic member 2223 is omitted from the conductive member, the first conductive member 21 and the second conductive member 22 are connected with each other through magnetic adsorption to ensure the contact effect therebetween.

Specifically, one of the first conductive member 21 and the second conductive member 22 includes an electromagnetic coil, and the other of the first conductive member 21 and the second conductive member 22 includes an electromagnetic sheet. The electromagnetic coil adsorbs the electromagnetic sheet. After the first shell 11 and the second shell 12 is assembled with each other, the electromagnetic coil adsorbs the electromagnetic sheet, causing the first conductive portion and the second conductive portion to keep in a contact state under a magnetic attraction force between the electromagnetic coil and the electromagnetic sheet, so as to ensure power transmission and signal transmission therebetween.

Optionally, one of the electromagnetic coil and the electromagnetic sheet is connected to the first conductive portion, and the other of the electromagnetic coil and the electromagnetic sheet is connected to the second conductive portion, so that the first conductive portion and the second conductive portion can be affected by the magnetic attraction force between the electromagnetic coil and the electromagnetic sheet.

Optionally, the first conductive portion can be a probe 222, a conductive sheet 212, an elastic piece or a spring, while the second conductive portion can also be a probe 222, a conductive sheet 212, an elastic piece or a spring.

In some embodiments, one of the first conductive member 21 and the second conductive member 22 includes a magnetic male seat, and the other of the first conductive member 21 and the second conductive member 22 includes a magnetic female seat. The magnetic male seat adsorbs the magnetic female seat, so that the contact effect between the first conductive portion and the second conductive portion can also be ensured through the magnetic attraction force between the magnetic male seat adsorbs the magnetic female seat.

In the third embodiment, when the first shell 11 and the second shell 12 are disassembled, there is no need to disassemble any interfaces of the outboard machine. After the first shell 11 and the second shell 12 are separated from each other, the wiring module 20 is disconnected and separated so that the first shell 11 or the second shell 12 can be directly removed, which is easy to operate without being limited by operation spaces, has good safety for operators, and reduces usage and maintenance costs.

Obviously, the above embodiments of the present disclosure are only intended to clearly illustrate the examples provided, and are not intended to limit implementation embodiments of the present disclosure. Any variation or replacement made by one of ordinary skill in the related art without departing from the spirit of the present disclosure shall fall within the protection scope of the present disclosure, which is no need or inability to exhaustively list all implementation embodiments of the present disclosure herein.

What is claimed is:

1. An outboard machine comprising:

a housing (10) comprising a first shell (11) and a second shell (12) detachably connected to the first shell (11);

a control module comprising a first control member (31) arranged on the first shell (11), and a second control member (32) arranged on the second shell (12); and a wiring module (20) comprising a first conductive member (21) arranged on the first shell (11) and electrically connected to the first control member (31), and a second conductive member (22) arranged on the second shell (12) and electrically connected to the second control member (32); and wherein when the first shell (11) and the second shell (12) are fixed with each other, the first conductive member (21) abuts against the second conductive member (22).

2. The outboard machine as claimed in claim 1, wherein the first conductive member (21) elastically abuts against the second conductive member (22).

3. The outboard machine as claimed in claim 2, wherein the first conductive member (21) comprises a first fixing bracket (211) arranged on the first shell (11), and a conductive sheet (212) arranged on the first fixing bracket (211);

the second conductive member (22) comprising a second fixing bracket (221) arranged on the second shell (12), and a probe (222) arranged on the second fixing bracket (221); and wherein when the first shell (11) is fixed with the second shell (12), the probe is in contact with the conductive sheet (212); while when the first shell (11) is disassembled from the second shell (12), the probe (222) is separated from the conductive sheet (212).

4. The outboard machine as claimed in claim 3, wherein the first fixing bracket (211) comprises:

a fixing plate (2111) parallel to a first inner wall (111) of the first shell (11) and fixed with the inner wall of the first shell (11); and a base (2112) connected with the fixing plate (2111) and an angle formed between the base (2112) and the fixing plate (2111), and the conductive sheet (212) detachably arranged on the base (2112).

5. The outboard machine as claimed in claim 4, wherein a clamping slot (21122) is arranged on the base (2112), and an elastic portion (2121) is arranged on the conductive sheet (212); the conductive sheet (212) inserted into or taken out of the clamping slot (21122), and the elastic portion (2121) abutting against a second inner wall (211221) of the clamping slot (21122).

6. The outboard machine as claimed in claim 5, wherein the base (2112) comprises a groove (21121) passing through an end face of the base (2112) that is away from the fixing plate (2111), the clamping slot (21122) formed by inwardly concaving a side wall of the groove (21121), and an edge of the conductive sheet (212) inserted into the clamping slot (21122).

7. The outboard machine as claimed in claim 6, wherein the first fixing bracket (211) comprises a plurality of stiffeners (2113), two adjacent edges of each of the plurality of stiffeners (2113) respectively connected to the fixing plate (2111) and the base (2112); and the plurality of stiffeners (2113) arranged on a side of the base (2112) away from the probe.

8. The outboard machine as claimed in claim 6, wherein the clamping slot (21122) is formed by inwardly concaving an end face of the base (2112) that is away from the fixing plate (2111), and a hole (21123) is arranged on a side of the base (2112) that faces the probe, the probe passing through the hole (21123) to abut against the conductive sheet (212).

9. The outboard machine as claimed in claim 8, wherein the base (2112) comprises an annular flange (21124) surrounding around the hole (21123), the probe (222) extending into the annular flange (21124).

10. The outboard machine as claimed in claim 3, wherein the second fixing bracket (221) comprises:

a seat (2211) with a through-hole (22111) being formed at a bottom surface thereof; and a sleeve (2212) arranged around the through-hole (22111), and the probe (222) penetrating into the sleeve (2212).

11. The outboard machine as claimed in claim 10, wherein the probe is a spring probe and comprises:

a fixing portion (2221) inserted into the sleeve (2212), one end of the fixing portion (2221) detachably connected to a first limiting portion (22211), the first limiting portion being in contact with one end face of the sleeve (2212); and a body (2222) with one end slidably passing through the fixing portion (2221) and the other end being in contact with the conductive sheet (212); the body (2222) comprising a second limiting portion (22221) abutting against the other end face of the sleeve (2212); and an elastic member (2223) sleeved on the body (2222), one end of the elastic member (2223) connected to the fixing portion (2221), and the other end of the elastic member (2223) connected to the body (2222).

12. The outboard machine as claimed in claim 11, wherein at least two posts (2213) are arranged inside the body (2211), and a positioning hole (22131) arranged in each of the at least two posts (2213), the second shell (12) comprising a supporting rib extending into the positioning hole (22131).

13. The outboard machine as claimed in claim 12, wherein outer walls of two adjacent posts (2213) are connected with each other to form a concave guiding groove (2214) with an arc-shaped wall thereof.

14. The outboard machine as claimed in claim 12, wherein the sleeve (2212) is arranged inside the seat (2211) and formed on opposite sides of the post (2213), the probe received in each sleeve (2212) and the conductive sheet (212) arranged on each probe (222).

15. The outboard machine as claimed in claim 2, wherein the first conductive member (21) comprises a first fixing bracket (211) and at least two conductive sheets (212), the first fixing bracket (211) comprising a fixing plate (2111), a base (2112) and a stiffener (2113), the fixing plate (2111) parallel to a first inner wall of the first shell (11) and fixed with the inner wall of the first shell (11), the base (2112) connected with the fixing plate (2111) and an angle formed between the base (2112) and the fixing plate (2111), a groove (21121) arranged on the base (2112) and passing through an end face of the base (2112) that is away from the fixing plate (2111), a clamping slot (21122) formed by inwardly concaving a side wall of the groove (21121), an edge of the conductive sheet (212) inserted into or taken out of the clamping slot (21122), and an elastic portion (2121) arranged on the conductive sheet and abutting against a second inner wall of the clamping slot (21122), two adjacent edges of the stiffener (2113) respectively connected to the fixing plate (2111) and the base (2112), and the stiffener (2113) arranged on a side of the base (2112) that is away from the groove (21121); and wherein the second conductive member (22) comprises a second fixing bracket (221) and at least two probes (222), each of the at least two probes correspondingly comprising the conductive sheet; and the second fixing bracket (221) comprising a seat (2211), a sleeve (2212) and at least two posts (2213), a through-hole arranged on a bottom surface of the seat (2211), and the sleeve (2212) arranged around the through-hole; the probe (222) comprising a fixing portion (2221), a body (2222) and an elastic member (2223), wherein the fixing portion (2221) is inserted into the sleeve (2212), one end of the fixing portion (2221) detachably connected to a first limiting portion that abuts against one end face of the sleeve (2212), one end of the body (2222) slidably passing through the fixing portion (2221), and the other end of the body (2222) being in contact with the conductive sheet, the body (2222) comprising a second limiting portion abutting against the other end face of the sleeve (2212); the elastic member (2223) sleeved on the body (2222), one end of the elastic member (2223) connected to the fixing portion (2221), and the other end of the elastic member (2223) connected to the body (2222), a positioning hole (22131) arranged in the post (2213), the second shell (12) comprising a supporting rib (121) extending into the positioning hole, and outer walls of two adjacent posts (2213) connected to each other to form a concave guiding groove (2214) with an arc-shaped wall thereof, the sleeve (2212) arranged inside the seat (2211) and formed on opposite sides of the post (2213), the probe received in each sleeve (2212).

16. The outboard machine as claimed in claim 3, wherein an installation position between the housing (10) and at least one of the first fixing bracket and the second fixing bracket is adjusted.

17. The outboard machine as claimed in claim 16, wherein at least one of the first fixing bracket (211) and the second fixing bracket (221) is fixed with the housing (10) through a fastener; and a long-strip hole formed on at least one of the first fixing bracket (211) and the second fixing bracket (221), and the fastener passing through the long-strip hole and engaged with the housing (10).

18. The outboard machine as claimed in claim 1, wherein the first conductive member (21) magnetically abuts against the second conductive member (22).

19. The outboard machine as claimed in claim 1, wherein one of the first conductive member and the second conductive member comprises an electromagnetic coil or a magnetic male seat, and the other of the first conductive member and the second conductive member comprises an electromagnetic sheet or a magnetic female seat; the electromagnetic coil adsorbed the electromagnetic sheet, and the magnetic male seat adsorbed the magnetic female seat.

20. The outboard machine as claimed in claim 1, wherein the first shell (11) comprises a first end face (112), and the second shell (12) comprises a second end face (122), a shape of the first end face same as that of the second end face, both the first end face (112) and the second end face (122) are non-centrosymmetric.

* * * * *